United States Patent [19]

Lanni et al.

[11] Patent Number: 4,621,911

[45] Date of Patent: Nov. 11, 1986

[54] STANDING WAVE LUMINESCENCE MICROSCOPY

[75] Inventors: Frederick Lanni; D. Lansing Taylor; Alan S. Waggoner, all of Pittsburgh, Pa.

[73] Assignee: Carnegie-Mellon University, Pittsburgh, Pa.

[21] Appl. No.: 711,065

[22] Filed: Mar. 12, 1985

[51] Int. Cl.[4] .......................................... G02B 21/06
[52] U.S. Cl. .................................................. 350/524
[58] Field of Search ................ 350/509, 510, 523, 524

[56] References Cited

U.S. PATENT DOCUMENTS 4,311,358  1/1982  Gibbons et al. ...................... 350/523
4,525,858  6/1985  Cline et al. ........................... 356/376

OTHER PUBLICATIONS

SPIE vol. 190 LASL Optics Conference (1979), Improved Dark-Field-Like Surface Inspection Technique Using Total Internal Reflection, by P. A. Temple, pp. 44-51.
Applied Optics vol. 20, No. 15, 1981, Total Internal Reflection Microscopy: A Surface Inspection Technique, by P. A. Temple, pp. 2656-2664.
"X-ray Standing Waves in Garnet Crystals" by S. Lagomarsino, F. Scarinci and A. Tucciarone, Physical Review, vol. 29, No. 9, May 1, 1984, pp. 4859-4863.

Primary Examiner—John K. Corbin
Assistant Examiner—Vincent J. Lemmo
Attorney, Agent, or Firm—Buell, Ziesenheim, Beck & Alstadt

[57] ABSTRACT

An optical microscope and a method are described wherein a luminescent specimen is located in, and illuminated by, a nodal standing wave field. Luminescence (fluorescence or phosphorescence) is excited in a series of parallel equispaced laminar antinodal zones separated by a series of dark nodal zones that span the specimen. By controlling the node spacing and phase of the standing wave field, a set of luminescence images of the specimen can be observed and recorded. Means can be provided for computing a three-dimensional distribution of light emitters within the specimen from this set of images.

47 Claims, 14 Drawing Figures

Surface - Labeled Object

▒ = Emission

(Bright parts of image)

Image

Fig. 3B.

⌇ = Zones of Emission

Cross Section of Object

Fig. 4A.

Volume - Labeled Object

▒ = Emission

(Bright parts of image)

Image

Fig. 4B.

▒ = Zones of Emission

Cross Section of Object

STANDING WAVE LUMINESCENCE MICROSCOPY

This invention was made under National Institutes of Health Grants 1-54528 and 1-54530.

This invention relates to luminescence optical microscopy, including fluorescence and phosphorescence optical microscopy. It relates to an apparatus having the capability of selectively optically illuminating particular zones in a specimen and to methods employing said apparatus.

The central problem in the science of microscopy is the formation of images that magnify the linear dimensions of an object and accurately reproduce relative spatial features up to the limit of resolution set by physical optics. The image is generally a two dimensional intensity map that is a projection of a three dimensional object. A single image of this type does not provide information about the relative position of the features of the object in the dimension normal to the image plane, i.e. a three dimensional reconstruction of the object cannot be made. It is the purpose of this invention to provide apparatus and methods for a three dimensional reconstruction of a specimen in a luminescence microscope.

In accordance with the present invention the specimen being viewed or examined is disposed within a field of standing waves of light. The waves are preferably in the visible range but may also be in the ultraviolet range. A standing wave field of light may include equispaced nodes and antinodes. Nodes are regions of minimal light intensity and antinodes are regions of maximal light intensity. A field of standing waves can be produced by overlapping two or more beams of coherent light. Electric field nodes are formed when the beams are s-polarized. Magnetic field nodes are formed when the beams are p-polarized. Preferably, the light is also collimated and monochromatic. A field of standing waves is also produced by overlapping incident and reflected rays from a single beam of coherent light. A laser is a suitable source of coherent light.

The use of a standing wave field at X-ray wavelengths for locating heavy atoms in a crystal lattice has been reported in an article entitled "X-ray standing waves in garnet crystals" by S. Lagomarsino, F. Scarinci and A. Tucciarone, Physical Review, Volume 29, Number 9, May 1, 1984, pages 4859–4863. The authors used a standing wave field at X-ray wavelengths in locating heavy atoms in a crystal lattice by measuring induced fluorescence at X-ray wavelengths, which is a function of the position of the heavy atoms relative to nodes or antinodes of the excitation field. The method of the article does not employ a microscope or an image-forming optical system. Furthermore, the method of the article depends upon first knowing the geometric structure of the lattice containing the atoms of interest. In contrast, the method of this invention does not require any significant prior knowledge of the object being examined and does not require X-rays but is performed simply with an optical luminescence microscope and optical image forming means. The present method can function with surface luminescence labeling, as well as volume luminescence labeling, whereas the method of the article can only function with volume (interior) luminescence labeling.

A standing wave luminescence microscope of this invention can comprise all or some of the following elements: A microscope equipped with means to produce a standing wave field of light at the specimen, means to control the node spacing of the field, means to control the phase of the field (relative position of the nodal planes with respect to a specimen-fixed reference point), a continuous or pulsed source of light of sufficient lateral and longitudinal coherence to form a well-modulated standing wave field of the proper wavelength to excite fluorescent or phosphorescent molecules in the specimen, means for recording the fluorescence or phosphorescence image of the specimen and means for processing the image data to generate a tomographic reconstruction of the specimen object.

A luminescence microscope of standard design can be employed which is equipped with a filter to absorb scattered light at the excitation wavelength and pass efficiently the band of wavelengths that corresponds to the luminescence emission of the specimen. The standing wave illuminator can have any one of several designs. The simplest is based on the use of reflection or total internal reflection to fold a beam from a laser with the specimen located in the overlap region of the incident and reflected waves. Node spacing in the standing wave field is controlled by adjustment of the angle of incidence of the excitation field, or by variation of the excitation wavelength.

The phase of the standing wave field can be adjusted by shifting the phase of one incident beam (in a crossed beam configuration) by the use of a variable retardation plate, or by moving the folding reflector relative to the specimen (in the folded-beam configuration). A video camera and image-processing computer can be employed with the standing wave luminescence instrument to allow rapid acquisition of a set of standing wave luminescence images and computation of the tomographic reconstruction of the luminescence emitter distribution in the specimen. Tomographic reconstruction refers to a three-dimensional map or representation of light-emitter density from an object. The map may be displayed in various ways, such as a set of stacked images or a table of numbers. The computer also serves to control and synchronize the various optical and electronic components of the instrument.

The present invention provides an alternative to highly localized illumination in a microscope by providing a spatially distributed field having a simple, well-defined intensity profile. The electromagnetic standing wave field formed by intersecting two coherent light beams can have the necessary characteristics under certain conditions. If the intersecting beams are coherent (laterally and longitudinally), collimated, s-polarized, and of equal intensity the standing wave field in the overlap region consists of a periodic array of planar zones in which stationary nodes of zero electric intensity separate stationary zones of high intensity. The present invention employs this kind of field for luminescence microscopy, preferably with a transformation that relates the images obtained to the tomographic reconstruction of the specimen. The microscope, in the usual sense, provides lateral resolution of the specimen, and the standing-wave field provides axial resolution. Luminescence images of the specimen are simplified because not all zones of the object are excited to emit for any one image.

In general, the overlap or superposition of two mutually coherent radiation fields will produce a standing wave field in the region of intersection. The standing wave field may have electric or magnetic nodes (surfaces of zero intensity) when s-polarized or p-polarized beams, respectively, are used. The field nodes will generally be normal to the optical axis of the microscope. However, they need not be constrained to be normal to the axis. For purposes of this type of microscopy, a nodal standing wave field in the specimen under observation is of greatest utility and can be produced in many different ways. Following are examples of methods for producing a nodal standing wave field of coherent, s-polarized light:

1. Reflection of an incident beam at a plane mirror adjacent to the specimen.
2. Reflection of an incident beam by total internal reflection from a plane dielectric boundary adjacent to the specimen. Total reflection ensures that the two beams are of equal intensity which gives zero light intensity at the nodes. Total internal reflection is achieved when the angle of incidence of the beam is equal to or greater than the critical angle.
3. Intersection of two separate equal-intensity beams of coherent s-polarized light in the specimen, and
4. Insertion of the specimen into a laser cavity or optical resonator.

Within the standing wave field a series of nodes and antinodes are established. Nodes are regions of minimal light intensity and are established in those regions where intersecting waves of incident and reflected coherent light or of two separate beams of coherent light cancel each other. Antinodes are regions of maximal light intensity and are established in those regions where waves of incident and reflected light or of separate beams of coherent light reinforce each other.

A microscope specimen object illuminated in a standing wave field of the proper wavelength to excite luminescence will emit the luminescence intensely at the locations of the antinodes of the standing wave field and will emit the luminescence minimally at the locations of the nodes of the standing wave field. The regions of intense luminescence emission appear as bright regions in the field of the microscope. The images so formed can be observed and/or recorded. These nodal and antinodal regions can take the form of alternating equi-spaced light and dark parallel bands or planes lying at right angles to the vertical axis of the specimen which can be the optical axis of the microscope.

As an illustration of the way in which depth information (axial position) is encoded into the image of a luminescent specimen disposed within a nodal standing wave field, first consider a biologic cell which has been treated to render it surface-luminescent. The cell will generally be apposed to or attached to a glass slide, so that its basal surface (membrane) is relatively flat, but the upper surface will generally have both convex and concave domains relative to the optical axis. The intersection of the antinodal zones of the excitation field with the surface of the specimen will result in luminescence emission from closed curves of equal elevation in the specimen, much as a topographic map displays elevation by use of contour lines. However, unlike a map which has numerical data supplied, there is no way to distinguish in a single image concentric emission contours due to a concave region, and those due to a convex region. The distinction may be made by shifting the position of the specimen relative to the standing wave field (usually by phase-shifting the field); if the nodal planes of the field are raised in elevation, the concentric emission zones about a convex region will contract in diameter, while those about an upwardly concave region of the specimen surface will expand. Since the nodal and antinodal zones of the excitation field can be shifted by accurately known distances on the order of a fraction of a wavelength, the difference in contour position in the two images encodes the elevation difference between two loci on the surface of the specimen. Because the specimen will generally have a closed surface, each image will have contours due to emission from the "top" and "bottom" surfaces. These contours will generally intersect and be confused. Later in this specification, it is shown how a set of three images, each made at a particular phase of the excitation field relative to the specimen, resolves this ambiguity.

In the more general case, the object is inhomogeneously bulk-luminescent, i.e., volume or interiorally luminescence labeled. In this case, discrete closed contours may not be seen, but rather images will appear stacked since there will be overlap in the 2-d image of the emission from consecutive antinodal zones. A tomographic reconstruction of the object can be made in the case of either volume-luminescence or surface-luminescence.

These discussions will be illustrated by reference to the attached figures in which.

Figure 1:
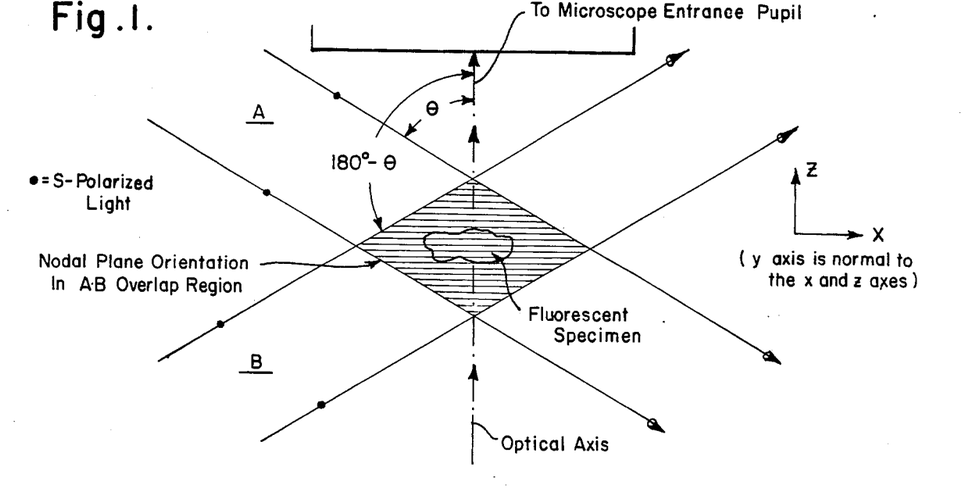
FIG. 1 is a schematic representation of standing wave illumination showing a specimen in a standing wave field of s-polarized light and on the optical axis of a microscope.

FIG. 1 shows the intersection at a fluorescent or phosphorescent specimen of two coherent, collimated, monochromatic beams of light, A and B, of a wavelength suitable for excitation of fluorescence or phosphorescence in the specimen. The beams of light are s-polarized. The s-polarization state of beams A and B is defined by the plane of the figure: the electric field vector of A and B must be perpendicular to the figure planes for electric dipole excitation of the specimen by a nodal standing wave field. To excite magnetic dipoles in a nodal standing wave field, the electric field vector of A and B must lie in the plane of the figure (p-polarization). Most luminescent stain molecules of use in microscopy exhibit electric dipole transitions, therefore the s-polarized field is of prime interest.

Rays A represent the propagation of a collimated beam (plane waves) that makes an angle $\theta$ with the optical axis of the microscope. Rays B represent the propagation of a second collimated beam that makes an angle $180° - \theta$ with the optical axis, and is coplanar with A and the optical axis.

The insert in FIG. 1 shows the theoretical x and z axes of the system. The y axis, not shown, extends at right angles to the x and z axes. The optical axis extends along the z axis. In the region of overlap of beams A and B, the intensity of the illumination field is constant over any x-y plane (i.e. any plane normal to the optical axis) but is spatially periodic along the optical axis. If A and B are s-polarized, then the standing wave field is nodal as previously described. Therefore, an object inserted into this field will be illuminated by a laminar pattern of equispaced zones. Within any one period, the illumination intensity varies sinusoidally in the z-direction from zero (a node) through a maximum (an antinode) and back to zero.

FIG. 1 illustrates the relative location of the specimen, nodal planes, optical axis and microscope. The node spacing ($\Delta s$) of a standing wave field is defined by $$\Delta s = \lambda_o / 2n \cos \theta$$

where $\lambda_o$ = excitation wavelength in vacuo,
n = refractive index of the specimen, and
$\theta$ = angle between incident rays and the optical axis of the microscope.

The node spacing is therefore a function of the illumination wavelength, specimen refractive index and angle of incidence.

The standing wave field spatial period $\Delta S$ can be varied from a minimum of $\lambda_o/2n$ at normal incidence of beam A ($\theta_A = 0°$ in FIG. 1) and counterpropagating beam B ($\theta_B = 180°$) to arbitrarily large values of the period at grazing incidence. Therefore, the resolution in the z-direction of the standing-wave luminescence microscope is essentially the same as the lateral resolution of the optical microscope. In many cases however, $\lambda_o$, the wavelength of the illumination field, can be significantly shorter than the luminescence wavelength. In this case, even though the lateral resolution limit of the microscope is proportional to the luminescence wavelength, superresolution can be achieved along the z-coordinate because the period $\Delta S$ of the illumination field is proportional to $\lambda_o$ rather than the luminescence wavelength. Therefore, specimen features separated by approximately half of the minimum node spacing can be superresolved by shifting the phase of the standing-wave field by 180° so that an object located at a node is then fully illuminated; this moves the nodal planes by a distance of $\frac{1}{2} \times \Delta S = \lambda_o/4n$. For an excitation wavelength of 365 nm and a specimen refractive index of 1.33, the resolution limit is in principle 68 nm, whereas the lateral resolution limit of the microscope at the luminescence wavelength will be approximately 250 nm, under typical conditions.

The above discussion assumes that the specimen does not perturb the standing wave field significantly. This means that the optical absorbance of the specimen must be low, and that the refractive index of the specimen must be close to that of the surrounding medium. These conditions are closely obtained in fixed and embedded biological specimens and also by many types of live cells growing in tissue culture. In the latter case, the average refractive index of the cytoplasm is typically in the range 1.358–1.374. The refractive index of cell culture medium is typically 1.336, slightly greater than that of pure water. Water soluble polymeric materials that are not highly toxic to cells can be added to a culture medium to improve the index match to the cytoplasm, when necessary. Furthermore, optical models of the specimen in which refractive index is an explicit parameter permit analysis of standing-wave luminescence images even when there is significant perturbation of the field.

In practical embodiments of the standing-wave microscope, the full range of incidence angle, 0°–90°, will not be attainable. Therefore, the usable standing wave field spatial frequency range will extend from some value less than or equal to $2n/\lambda_o$ to some finite lower limit. However, because most biological specimens will be less than 5 microns in thickness, standing-wave field periods much greater than about twice the thickness, or 10 microns, will not contribute significantly to the Fourier representation of the object in the image data set. This cutoff corresponds to an incidence angle of approximately 89°. The design of the standing wave illuminator and the optical parameters of the specimen determine the practical limits on incidence angle.

Figure 2:
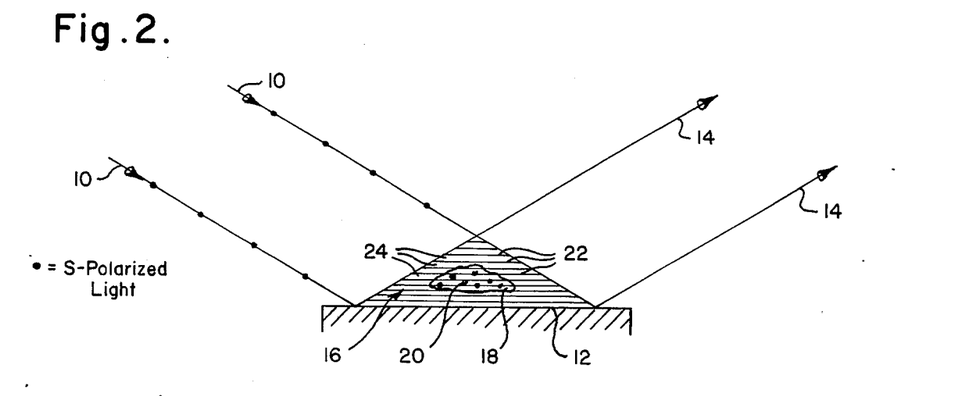
FIG. 2 illustrates the formation of a standing wave field containing a fluorescent specimen where the standing wave field is produced by reflecting incident rays from a reflecting surface.

Referring to FIG. 2, a beam of incident rays of coherent s-polarized light 10 is shown reflecting from a reflecting surface 12 which also serves as a specimen supporting means for a luminescence microscope to produce a beam of reflected rays 14. The shaded region 16 indicates the overlap of the incident and reflecting rays. A fluorescent or phosphorescent biologic specimen 18 such as a cell which may have a plurality of floating vesicles 20 is supported on reflecting surface 12 and is disposed within shaded region 16. The shaded region 16 is comprised of layered parallel planes of dark nodes 22 separated by layered parallel bright zones 24 spaced along the optical axis of the microscope. Nodal plane separation can vary between $\lambda_o/2n$ (~$\frac{1}{2}$ wavelength) to a value much greater than a wavelength) for $\theta \approx 90°$.

If a fluorescent floating vesicle 20 is moving within the specimen 18, the lateral component of the motion (along the x and y axes) is directly observable as a lateral displacement of the fluorescence image of 20 within the fluorescence image of 18. The axial or vertical component of the motion of 20 is observable as a temporal modulation of the brightness of 20 as it moves through nodal zones 22 and antinodal zones 24 of the field 16. The direction of axial motion of 20 can be determined by shifting the phase of the standing-wave field relative to the specimen. For example, if the axial component of the motion of 18 is upward in FIG. 2, and it is moving from a node towards an antinode, its fluorescence emission will be increasing with time. If the nodal planes of the standing-wave field are then also shifted upward by a small distance, a decrease in the brightness of 18 will be observed, followed by a continued increase as 18 approaches the antinodal plane. Alternatively if 18 were moving downwardly from a nodal zone to an antinodal zone, its brightness would also be increasing with time, but in this case an upward phase shift of the field would augment the brightness of 18. Since the phase of the standing-wave field can be controlled precisely, the axial displacement of a moving particle can be measured accurately by this method.

Figure 3A:
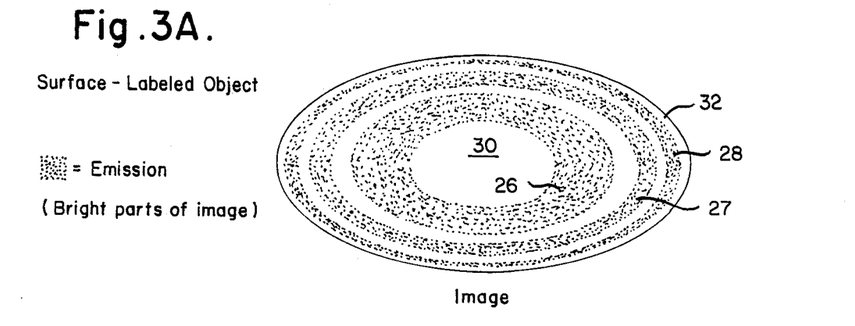
FIGS. 3A and 3B present the image and the cross-sectional view, respectively, of a surface-luminescent specimen showing the topological lines formed by the nodes and antinodes.
Figure 3B:
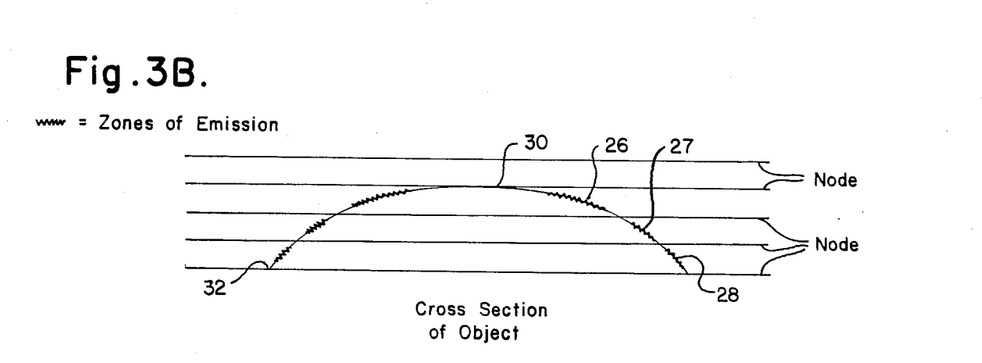

FIG. 3A presents a plan view image of a surface-labeled specimen object as it may appear in a standing wave field of a microscope. FIG. 3B presents a theoretic view of a cross-section of the specimen object. Concentric rings 26, 27 and 28 are bright emission antinodal zones and indicate the topography of the cellular surface. Referring to FIGS. 3A and 3B, the distance between dark region 30 at the peak of the surface and dark region 32 near the base of the surface can be determined by multiplying three (the number of bright emission zones between regions 30 and 32) times the distance between adjacent nodal lines. In a more complex object, concave and convex domains can be distinguished by observing the change in diameter or location of the concentric emission zones when the phase of the standing-wave field is shifted by a known amount.

Figure 4A:
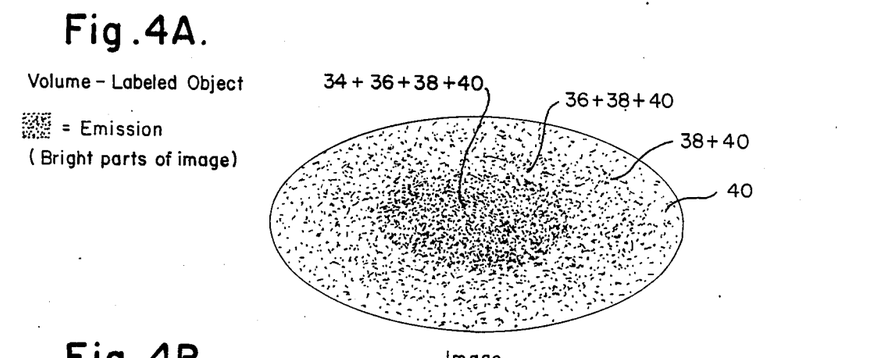
FIGS. 4A and 4B present the image and the cross-sectional view, respectively, of a volume-luminescent specimen, illustrating the emission zones excited by the nodes and antinodes.
Figure 4B:
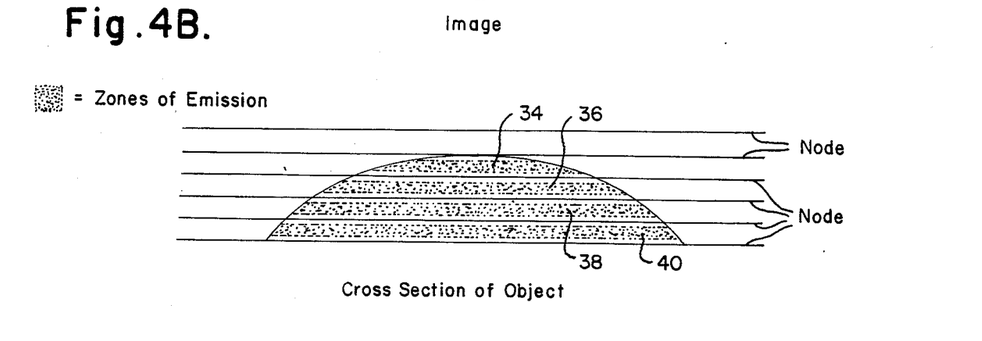

FIG. 4A presents a plan view image of a volume-labeled specimen object as it may appear in a standing-wave field of a microscope. FIG. 4B presents a view of a cross-section of the specimen object. Flat planal zones 34, 36, 38 and 40 represent bright anti-nodal zones extending through the object. In the fluorescence image formed by the microscope, the bright zones are totally additive near the center or the top of the object and are decreasingly additive in moving from the center to the periphery of the object. The brightness is a maximum at the center of the image because of the combined effects of planal zones 34, 36, 38 and 40 while the brightness is minimal near the periphery of the image and is due only to the effect of planal zone 40. In moving from the center to the periphery, brightness diminishes as planal zones 34, 36 and 38, progressively, fail to overlap planal zone 40. In the case where the internal distribution of emitters is inhomogeneous rather than homogeneous, the image would be more complex, but would still consist of contributions from the excitation zones as shown.

Figure 5:
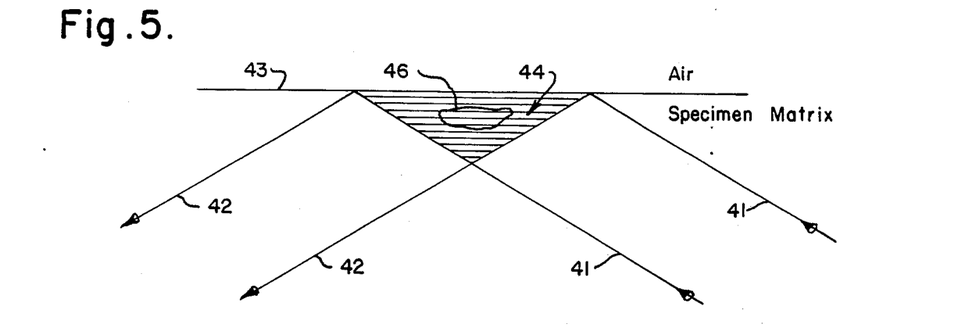
FIG. 5 illustrates the application of total internal reflection to the present invention.

FIG. 5 illustrates the application of the critical angle concept to a microscope of this invention. The incident beam of light comprising rays 41 impinges upon air-glass interface 43 at an angle of incidence at least as large as the critical angle so that it is reflected entirely within the glass as indicated by reflected rays 42, providing overlapping rays to produce a standing wave field 44. A luminescent specimen 46 to be viewed is disposed within standing wave field 44.

Figure 6:
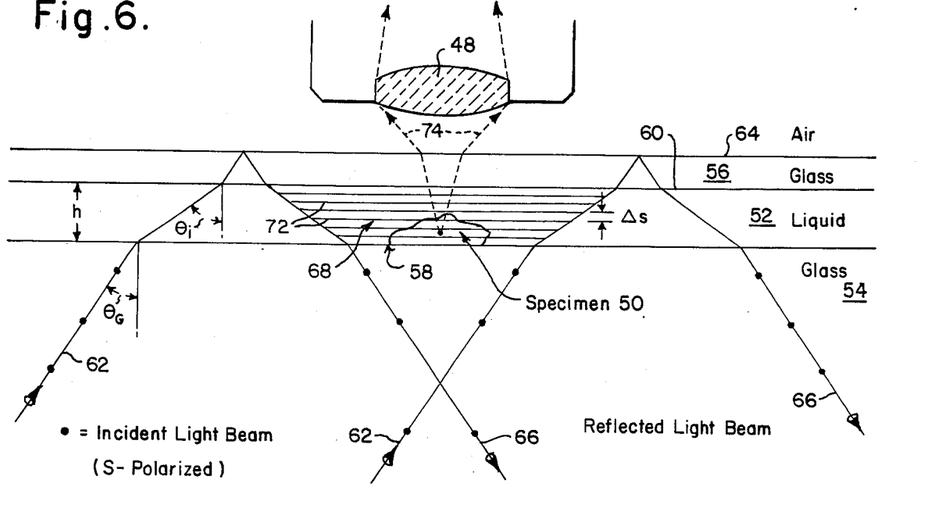
FIG. 6 is an illustration of an apparatus embodying total internal reflection for producing a standing wave field.

FIG. 6 presents in more detail the use of a microscope for observing a specimen disposed in a standing wave field produced by total internal reflection. FIG. 6 shows a microscope objective lens 48 for viewing a specimen 50 which is in a liquid 52 contained between a lower layer of glass 54 and an upper layer of glass 56. The glass-liquid-glass assembly constitutes a biologic slide having a lower glass-liquid interface 58 and an upper glass-liquid interface 60.

An incident beam of light comprising rays 62 reaches interface 58 at an angle of incidence $\theta_G$. Refraction in liquid 52 changes the angle of propagation to $\theta_i$. Glass 54 has an index of refraction $n_G$ while liquid 52 containing the specimen has a refractive index $n_L$. The law of refraction (Snells law) states the relationship of $\theta_G$ to $\theta_i$ as:

$$n_G \sin \theta_G = n_L \sin \theta_i$$

Refraction at liquid-glass interface 60 changes the angle of propagation of the incident beam back to $\theta_G$. If $\theta_G$ exceeds the glass-to-air critical angle, the incident beam of light will be 100 percent reflected at the air-glass interface 64. Thereby, the incident beam comprising rays 62 and the reflected beam comprising rays 66 will be of equal intensity. For $\theta_G$ to exceed the glass-to-air critical angle:

$$\theta_G > \sin^{-1} \frac{(n_{air})}{(n_{glass})} \text{ or } \theta_G > 41.3°$$

(for $n_{air} = 1.000$ and $n_{glass} = 1.515$)
or, more importantly:

$$\theta_i > \sin^{-1} \frac{n_{air}}{n_{liquid}}$$

The overlap of the rays of the incident beam 62 and reflected beam 66 provides standing wave field 68 around specimen 50. The equal intensity of the two beams, the coherence and the s-polarization of the light waves produces a field that has a series of nodes 72 all parallel to the upper glass window 56.

Nodal planes 72 are equispaced. The spacing between the nodal planes is indicated as $\Delta s$ in FIG. 6, where the spacing is greatly exaggerated. The size of nodal spacing $\Delta s$ can be calculated as follows:

$$\Delta s = \frac{\lambda_o}{2 n_L \cos \theta_i}$$

where
$\lambda_o$ = wavelength in vacuo
$n_L$ = refractive index of liquid
$\theta_i$ = angle of incidence noted in FIG. 6.

The overlap region of beams 62 and 66 extends through upper window 56 and into lower glass substrate 54. The node spacing in these two zones differs from that in specimen 52, but since the specimen does not extend into these layers, the nodes outside of the specimen layer are not indicated in FIG. 6.

In the apparatus of FIG. 6, $\theta_G$ is limited by the requirement that it exceed the critical angle. The critical angle was indicated above to be 41.3°. Therefore, the minimum node spacing is given by $$\Delta S_{min.} = \frac{\lambda_o}{2 n_L \cos \theta_i^{min}} = \frac{\lambda_o}{2 n_L \cos \left( \sin^{-1} \frac{n_{air}}{n_L} \right)} = 0.54 \lambda_o$$

For comparison, the node spacing at $\theta_G = 0°$ (normal incidence) is $$\Delta S = \frac{\lambda_o}{2 n_L \cos 0°} = 0.37 \lambda_o$$

which is the minimum possible for a given wavelength and refractive index.

The relative positions of the nodes and the specimen can be adjusted by small changes in the spacing of the upper and lower glass windows. In FIG. 6, this dimension is indicated as h. Since this spacing need be varied by only a fraction of a wavelength under most circumstances, piezoelectric devices can be used to regulate h.

Specimen 50 is stained by known methods to provide fluorescence emission which will be most intensely excited in the antinode bands of standing wave field 68.

This emission exits upper glass window 56 as indicated at 74 and is collected by microscope objective lens 48.

Figure 7:
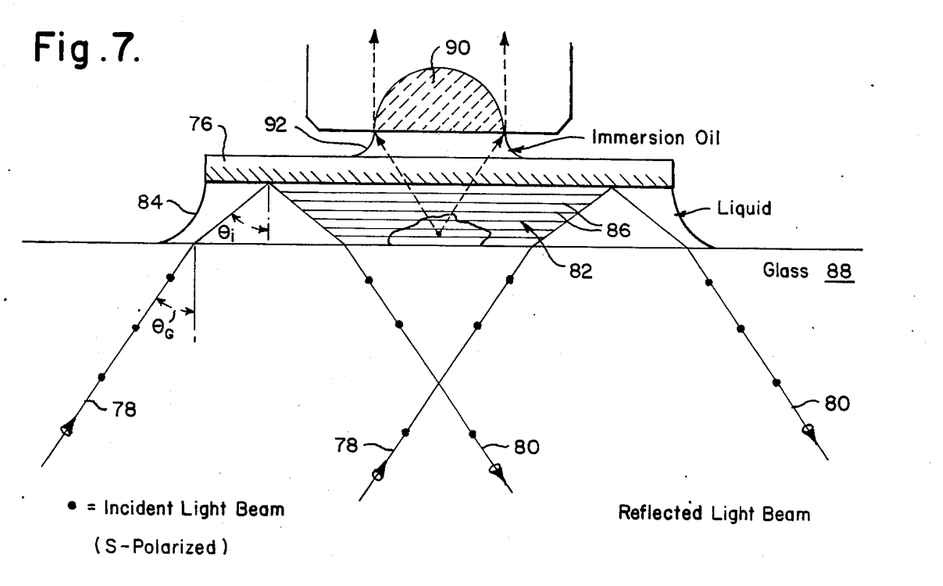
FIG. 7 illustrates a standing wave field produced by reflection at a dichroic, or wavelength-selective, high reflector.

FIG. 7 presents another mode for the production of a standing wave field by reflection. In the apparatus of FIG. 7, the upper window comprises a wavelength-selective, or dichroic, reflector 76. Window reflector 76 can be chosen so that its reflectivity is very high for a particular wavelength at a particular angle of incidence. The reflector can be chosen so that the incident beam is reflected with high efficiency, e.g. greater than 95 percent, and so that the fluorescence emission of the object is passed with high efficiency.

A set of various dichroic reflectors 76 would be used to collect a complete standing wave luminescence microscopy data array. Each reflector would be used for a single angle of incidence ($\theta_i$).

The incident rays 78 and the reflected rays 80 overlap to produce a standing wave field 82 in the specimen liquid layer 84. The nodal planes are equally spaced and are indicated as lines 86 in specimen layer 84. Because the reflectivity of the dichroic mirror is less than 100 percent, the light intensity at the nodal planes will not be exactly zero, but can be made very low.

Normal incidence ($\theta_i = 0°$) can be attained in the instrument of FIG. 7. Therefore, the minimum achievable node spacing will be attained as previously described.

In FIG. 7, the relative separation of the nodes and the specimen is adjusted by varying the separation of dichroic mirror 76 and the lower glass substrate 88. Fluorescence that passes through the dichroic mirror is collected by the microscope objective lens 90. Because reflection of the incident beam occurs at the lower surface of dichroic mirror 76, the microscope lens can be optically coupled to the upper surface of the dichroic mirror 76 by a layer of immersion oil 92. This permits the microscope to have a greater aperture angle and, hence, greater efficiency and resolution.

Figure 8:
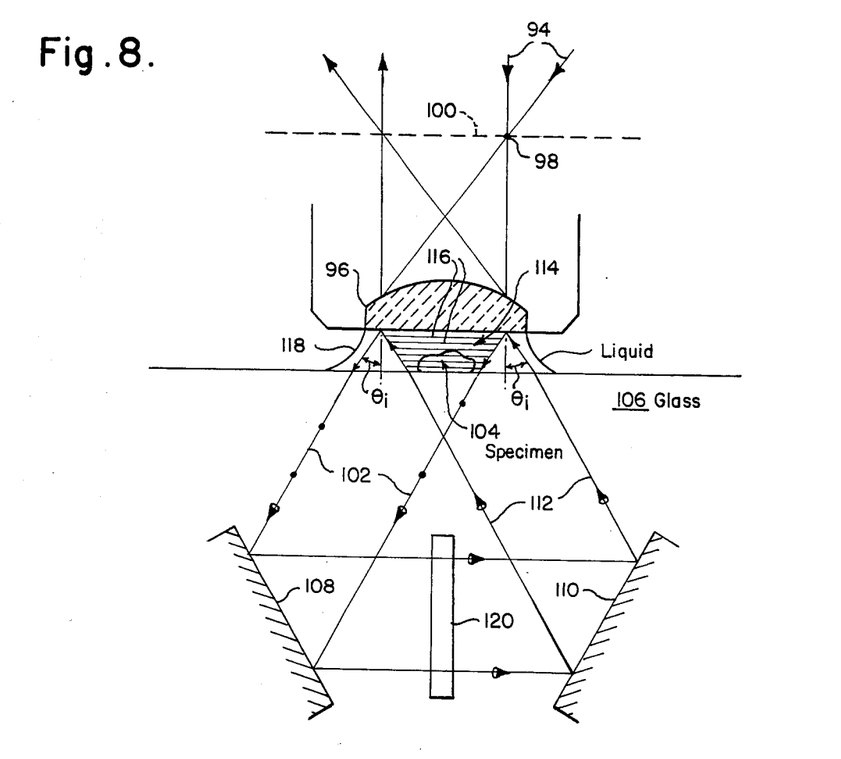
FIGS. 8 and 9 illustrate application to the invention of a standing wave field formed by intersecting coherent beams.

FIG. 8 illustrates the production of a standing wave field by intersecting two beams of coherent light in the specimen. FIG. 8 shows convergent, coherent, s-polarized light rays 94 directed into microscope lens 96 with a focal point 98 in the rear focal plane 100. The beam of rays 102 emerging from lens 96 into specimen 104 is therefore collimated and has an angle of propagation ($\theta_i$) that is a function of the location of focal point 98 in rear focal plane 100. For example, if focal point 98 were on the optical axis (on the centerline of the lens) the emerging beam would also be on the axis ($\theta_i = 0°$).

Below glass substrate 106 which supports specimen 104, or as an integral part of that substrate, are two reflectors 108 and 110 which serve to return the beam to the specimen at an angle of $180° - \theta_i$. The return beam comprises rays 112. Reflective loss will have reduced the returning beam intensity slightly. A standing wave field 114 is established in the region of overlap of rays 102 and 112. In field 114 the nodal planes 116 are parallel to the plane of glass substrate 106. The node spacing is given by the formula:

$$\Delta S = \frac{\lambda_o}{2n_L \cos \theta}$$

where $n_L$ is the index or refraction of the liquid layer 118 surrounding specimen 104.

The relative position of nodes 116 and specimen 104 can be adjusted by controlling the phase of rays 112 which re-enter lens 96. This can be done by inserting a phase retarder plate 120 into the beam between mirrors 108 and 110.

Figure 9:
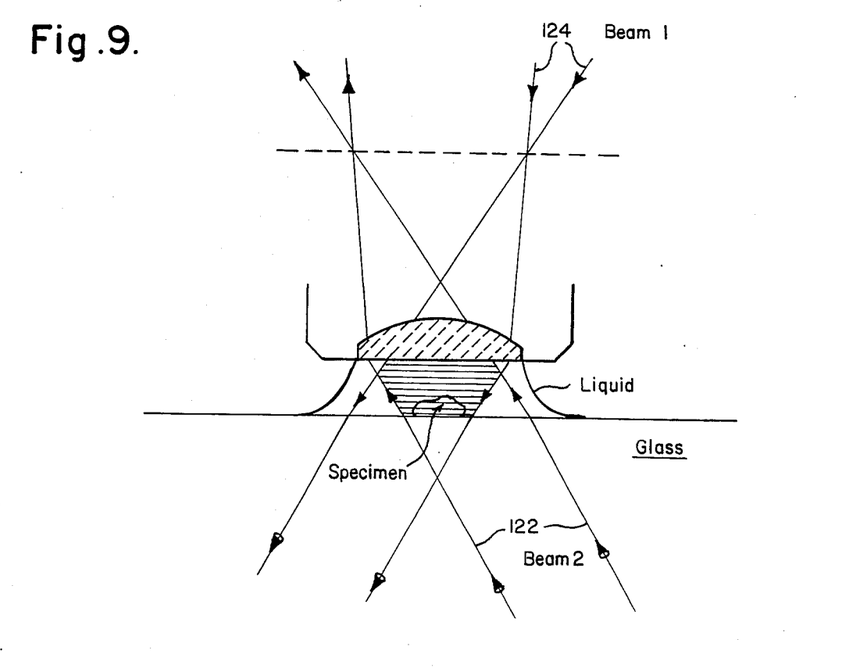

FIG. 9 presents an alternative arrangement to the dual-reflector arrangement of FIG. 8. In the instrument of FIG. 9 the incident beam is split before it enters the microscope, and one of the split beams comprising rays 122 is used as the re-entrant beam. The incident beam comprises rays 124. In the instrument of FIG. 9, complete and independent control over the intensity, angle and phase of each beam is possible. No special optical elements such as dichroic reflectors are required and nearly all incidence angles are accessible.

Figure 10:
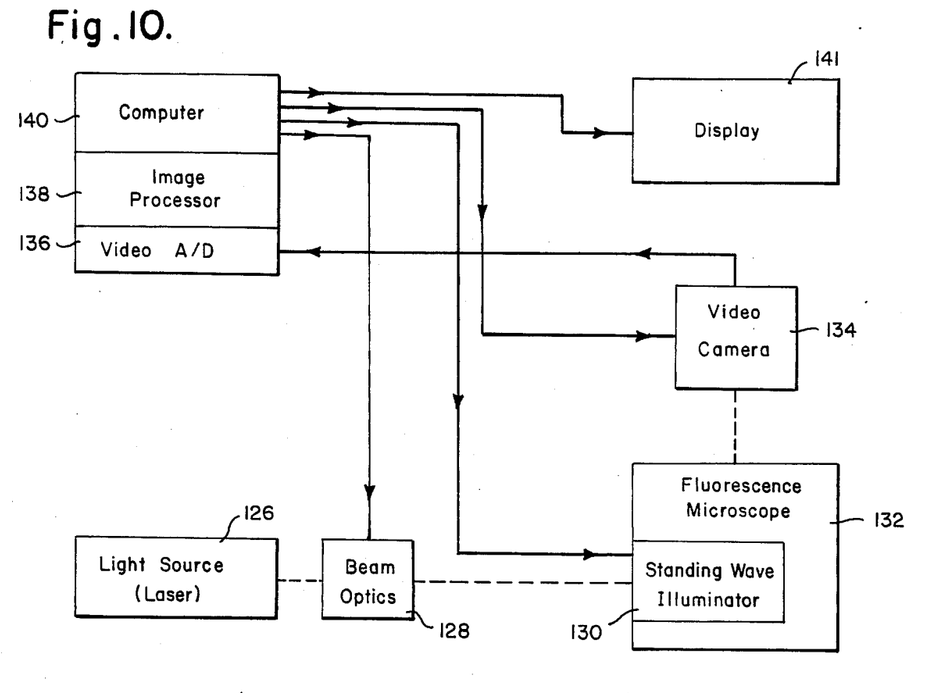
FIG. 10 illustrates an integrated system for luminesence microtomography.

FIG. 10 schematically illustrates an integrated system for producing a three-dimensional image according to the present invention. As shown in FIG. 10 a source of coherent light 126, such as a laser, provides a light beam which is passed through an optical system 128 and then passed to a standing wave illuminator 130 in a fluorescence microscope 132. Standing wave illuminator 130 can comprise a laser cavity. In such case, laser source 126 and beam optics 128 are not required.

Video camera 134 is sighted on the image of microscope 132. A video A/D (analog-to-digital converter) and image processor 138 operate on input from video camera 134. Computer receives signals from video camera 134, image processor 138, and controls video camera 134, beam optics unit 128 and standing wave illuminator 130. Finally, computer 140 provides a signal input to image display unit 141, which displays a reconstructed 3-dimensional image of the specimen.

As shown above, a microscope of this invention can include various means for controlling the phase of the standing wave field. For example, piezoelectric elements can move a reflecting or totally reflecting surface relative to the specimen being viewed. Such piezoelectric elements can be included in standing wave illuminator 130. Also, optical resonators can be included in standing wave illuminator 130. Also, an adjustable phase retarder plate can be used to control the phase of the standing wave field. In addition, a microscope of this invention can include means to control the excitation wavelength and thereby to simultaneously vary the node spacing and the phase of the standing-wave field. Furthermore, a microscope of this invention can employ a pulsed light source, such as a laser, to create a transient (nanosecond) standing-wave field with additional means for recording the luminescence image during the emission lifetime period following the pulse. Fluorescence lifetimes are generally in the 1-10 nanosecond range and phosphorescence lifetimes are generally in the microsecond to millisecond range.

Figure 11A:
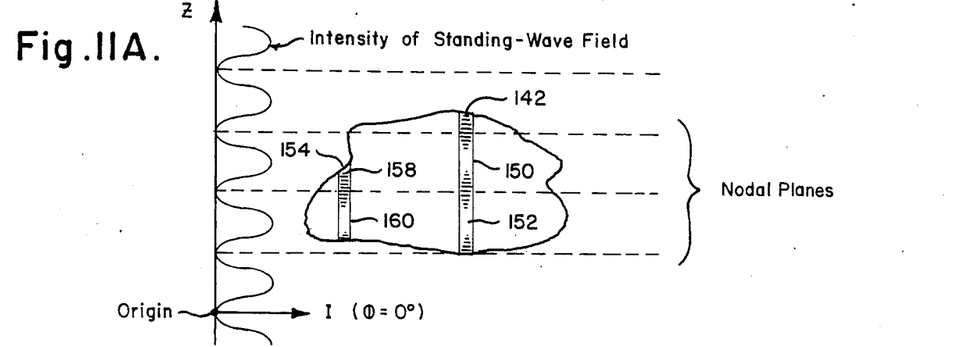
FIGS. 11A and 11B present two diagrams illustrating disposition of a specimen object in a standing wave field at a reference phase position, and after a phase shift of 180°.
Figure 11B:
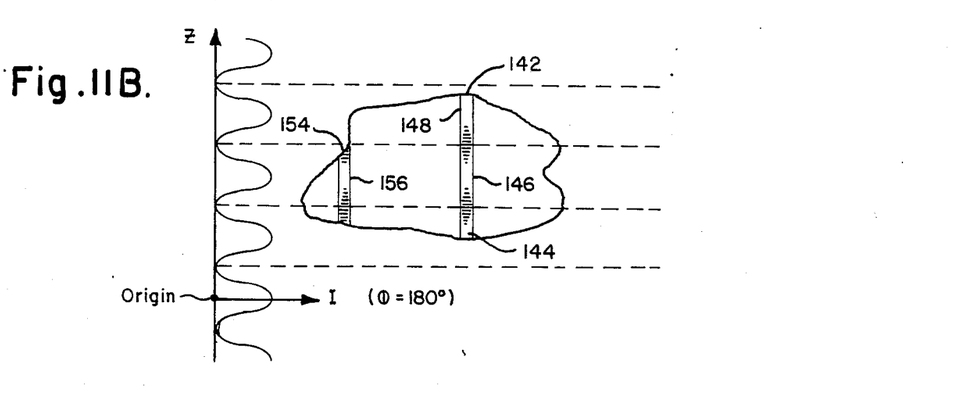

FIGS. 11A and 11B present two diagrams illustrating the intensity of standing-wave illumination of a specimen object as a function of its phase relationship with a standing field. FIGS. 11A and 11B illustrate a 180° phase shift of the standing wave field relative to the specimen.

The excitation intensity in a specimen along a column 142 or a column 154 in the z axis in the specimen as shown in FIG. 11 is:

$$I(z) = I_o \tfrac{1}{2}(1 - \cos(Kz + \phi))$$

where
$I_o$ = the intensity at an antinode
$K = 4\pi n \cos \theta / \lambda_o$,
n = specimen refractive index $\theta$ = incidence angle between excitation light rays and optical axis $\phi$ = phase angle that expresses the relative position of the nodal planes and the specimen object The above equation shows that the intensity of the illumination field is constant over any x-y plane (normal to the optical axis) but is spatially periodic along the optical axis. FIG. 11B shows that column 142 in the z axis of the specimen object is illuminated by the sum of three bright zones 144, 146 and 148. The brightness of the three zones are all generally of unequal magnitude because of their reference to the standing wave field and because of the inhomogeneous distribution of emitters. FIG. 11A shows that the same column 142 is illuminated by the sum of only two antinodal zones 150 and 152, when the phase of the field is shifted by 180° from that established in FIG. 11B. Another column 154 is illuminated by one antinodal zone 156 in FIG. 11B and by two antinodal zones, 158 and 160, in FIG. 11A. Therefore, the total brightness in the columns 142 and 154 as seen from above through the microscope will depend not only upon the emitter distribution within each column, but upon the number, and upon the segments of the antinodal zones contributing to the illumination because the illumination intensity varies sinusoidally in the z-axis from zero or a minimum (a node) through a maximum (an antinode) and back to zero. FIGS. 11A and 11B show that the segments of the antinodal zones contributing to the illumination can vary upon a shift in phase.

The fluorescence or phosphorescence emission rate of a dye molecule in the specimen is proportional to the local field intensity I. If a specimen inserted into the standing-wave field has an internal distribution of luminescent emitters $p(x,y,z)$, then the emission rate from a specimen volume element dV will be proportional to $I(z)$ and to $p(x,y,z)$:

$$df(x,y,z; K, \phi) = a \cdot p(x,y,z) I(z; K, \phi) dV$$

In the high depth-of-field limit, the luminescence image formed by the microscope is effectively the integral of df over the thickness of the specimen; i.e. the z-projection of the luminescence object:

$$F(x,y; K, \phi) = A' \int p(x,y,z) I(z; K, \phi) dz$$

By the use of the expression $I(z)$, and a trigonometric identity, the luminescence image $F(x,y)$ can be expressed as a sum of constant and quadrature terms:

$$F(x,y) = A \int p(x,y,z) (1 - \cos(Kz + \phi)) dz$$
$$= A \int p \, dz$$
$$-A \cos\phi \int p \cos(Kz) dz$$
$$+A \sin\phi \int p \sin(Kz) dz$$

The parameters K and $\phi$ which specify the node spacing of the standing wave field and its phase relative to a reference plane (z=0), can be varied so as to allow the resolution of $F(x,y)$ into three linearly independent image fields. This can be done by recording at least three standing-wave luminescence images for a fixed value of K, each having a different value of $\phi$. Choosing $\phi$=0°, 90°, and 180° for convenience (see FIGS. 11A and 11B), although other values for $\phi$ can also be selected:

$$Q(x,y;K) = F(x,y; K, 0°)$$

$$R(x,y;K) = F(x,y; K, 90°)$$

$$S(x,y;K) = F(x,y; K, 180°)$$

The standing wave luminescence images Q, R and S are then combined linearly to resolve the independent terms of F(x,y):

$$(\tfrac{1}{2}) S + (\tfrac{1}{2}) Q = A \int p \, dz$$
$$= F_o(x,y)$$
$$(\tfrac{1}{2}) S - (\tfrac{1}{2}) Q = A \int p \cos Kz \, dz$$
$$= F_c(x,y;K)$$
$$R - (\tfrac{1}{2}) S - (\tfrac{1}{2}) Q = A \int p \sin Kz \, dz$$
$$= F_s(x,y;K)$$

$F_o$, $F_s$, and $F_c$ respectively are the "DC", sine, and cosine maps of the Fourier coefficient of the specimen emitter distribution $p(x,y,z)$ at the spatial frequency $K/2\pi$ in the z-direction. From sets of standing-wave luminescence images made at different illumination spatial frequencies, the tomographic reconstruction of $p(x,y,z)$ can be computed by Fourier synthesis or any other similar procedure.

Because the three images $F_o$, $F_c$ and $F_s$ are linearly independent, a 3-layer tomographic approximation of $p(x,y,z)$ can be computed. From N sets of these image triplets, each set made at a distinct value of K, a (2N+1)-layer tomographic reconstruction can be computed (the image $F_o$ is the same for all K, therefore contributes only once and not N times to the set of linearly independent images). A convenient means for changing K to make each new image triplet is to vary the incidence angle between excitation light waves and the optical axis, which in turn varies the node spacing in the field.

The foregoing theory describes the case in which the depth-of-field of the microscope is greater than the spatial extent of the specimen along the optical axis; i.e., the full thickness of the specimen is in-focus. The greatest lateral resolution of the specimen, however, is obtained with high aperture objective lenses which have a correspondingly low depth-of-field. The situation will, therefore, occur in which each image recorded will have out-of-focus contributions due to antinodal zones which are not within the in-focus zone about the geometric focal plane of the microscope.

For a single value of K, a complete image set will therefore consist of more than the three images Q, R and S, but will consist of the triplets $Q_1$, $R_1$, $S_1$, $Q_2$, $R_2$, $S_2$ ... $Q_n$, $R_n$, $S_n$ where the focal plane of the microscope has been stepped to a new location along the z-direction for each triplet of images. The required number of such sets will be given roughly by the specimen thickness divided by the depth-of-field of the microscope. The image sets obtained for each value of K can then be processed by standard deconvolution methods to remove from each image the out-of-focus component due to the neighboring planes of the specimen.

This type of processing does not differ in any way from that now employed in the serial focal plane method of microtomography. The result of such processing is a single triplet of images Q', R' and S' which contains only in-focus components, and therefore can be processed as in the high depth-of-field case. The most advanced embodiment of the standing-wave luminesence microscope for purposes of microtomography will allow control of both focal plane and nodal plane position in the specimen-fixed coordinate system.

We claim:

1. An optical apparatus for observing a luminescent specimen comprising a luminescence optical microscope, standing wave field producing means for producing on the optical axis of said microscope a standing wave field of coherent light including nodes and antinodes at said specimen, said standing wave field producing means including at least one source of coherent light to form said standing wave field and to excite fluorescence or phosphorescence in said specimen at said antinodes, filter means in said microscope for absorbing scattered light at the excitation wavelength and for passing the wavelengths that correspond to the luminescence of the specimen, and supporting means for supporting said specimen in said standing wave field.

2. The apparatus of claim 1 wherein said light is collimated.

3. The apparatus of claim 1 wherein said light is monochromatic.

4. The apparatus of claim 1 including means to vary node spacing.

5. The apparatus of claim 1 including means to control the relative position of the nodes with respect to a fixed reference point on said specimen.

6. The apparatus of claim 1 including a source of coherent light.

7. The apparatus of claim 1 wherein said light is s-polarized.

8. The apparatus of claim 1 wherein said light is p-polarized.

9. The apparatus of claim 1 wherein said standing wave field is produced in the region of overlap of incident and reflected rays of coherent, polarized light.

10. The apparatus of claim 1 wherein said standing wave field is produced from laser light.

11. The apparatus of claim 9 including total internal reflection of the incident rays.

12. The apparatus of claim 9 including means for varying the angle of incidence of the incident rays.

13. The apparatus of claim 1 including means for recording the image of said specimen.

14. The apparatus of claim 13 including means for processing image data to generate a tomographic reconstruction of said specimen.

15. The apparatus of claim 1 including means to vary the wavelength of said coherent light.

16. The apparatus of claim 1 including a video camera for the rapid acquisition of a set of standing wave luminesce images and an image-processing computer for the tomographic reconstruction of the luminescence distribution in said specimen.

17. The apparatus of claim 1 wherein said means to produce a standing wave field includes a plane mirror adjacent to said specimen and means for reflecting an incident beam of coherent polarized light at said plane mirror to produce said standing wave field.

18. The apparatus of claim 1 wherein said means to produce a standing wave field includes a plane dielectric boundary adjacent to said specimen to provide total internal reflection of an incident beam of coherent light to produce said standing wave field.

19. The apparatus of claim 1 wherein said means to produce a standing wave field comprises a laser cavity with said specimen disposed in said laser cavity.

20. The apparatus of claim 1 wherein said means to produce a standing wave field includes an optical resonator with said specimen disposed within said optical resonator.

21. The apparatus of claim 1 including piezoelectric means for moving a reflecting surface relative to the specimen to control the phase of the standing wave field.

22. The apparatus of claim 1 including adjustable phase retarder plate means for controlling the phase of the standing wave field.

23. The apparatus of claim 1 including means for controlling the excitation wavelength of the standing wave field to simultaneously vary the node spacing and phase of the standing wave field.

24. The apparatus of claim 1 including pulsed light source means for creating a transient standing wave field, and means for recording the luminescence image in the fluoresence or phosphorescence light lifetime following the pulse.

25. The apparatus of claim 24 wherein said pulsed light source means is a laser.

26. The apparatus of claim 1 wherein said specimen is surface-labeled for luminescence.

27. The apparatus of claim 1 wherein said specimen is volume-labeled for luminescence.

28. A method employing a luminescence optical microscope for obtaining a three-dimensional representation of an object comprising labeling said object with fluorescent or phosphorescent material, disposing said object at the optical axis of said microscope, establishing a standing-wave field of coherent s-polarized excitation light at said object to produce equispaced nodal and antinodal planes at said object, and observing emitted light from said object from said antinodes with said microscope.

29. The method of claim 28 wherein said object is surface-labeled with luminescent material.

30. The method of claim 28 wherein said object is volume-labeled with luminescent material.

31. The method of claim 28 including setting a nodal plane of said field to a reference position in said object.

32. The method of claim 31 wherein the node spacing illuminates said object by a laminar pattern of equispaced zones extending in the x, y direction with the light intensity varying sinusoidally in the direction of the microscope optical axis (z direction) from a minimum at a node through a maximum at an antinode and back to a minimum to establish sinusoidal periods, and recording the luminescence image excited by this illumination in said object.

33. The method of claim 32 including setting the field at three phases with respect to said object and recording the image at each phase to obtain images with linearly independent components.

34. The method of claim 33 including computing a tomographic reconstruction of said object.

35. The method of claim 32 including recording images with the field phase set at 0°, 90° and 180°, respectively, giving images with linearly independent components.

36. The method of claim 35 including computing a tomographic reconstruction of said object.

37. The method of claim 33 including varying the nodal spacing to provide a different sinusoidal period and again recording a complete set of images at three phases giving images with linearly independent components.

38. The method of claim 37 including computing a tomographic reconstruction of said object.

39. The method of claim 32 including varying the nodal spacing to provide a different sinusoidal period and recording a complete set of images at phase angles of 0°, 90° and 180°, respectively.

40. The method of claim 39 including computing a tomographic reconstruction of said object.

41. The method of claim 28 including changing the spacing between nodal and antinodal planes in said field.

42. A method employing a luminescence microscope for making a tomographic reconstruction of an object from fluorescent or phosphorescent light emitted from said object, said object being labeled with a fluorescent or phosphorescent material, said method comprising disposing said object along the optical axis of said microscope, establishing a standing wave field of coherent s-polarized excitation light to produce nodal and antinodal planes through said object, establishing a reference nodal plane disposed at an object-fixed reference position, establishing node spacing in said standing wave field to illuminate said object by a laminar pattern of equispaced zones in the x,y direction with the light intensity varying sinusoidally in the direction of the microscope optical axis (z direction) from a minimum at a node through a maximum at an antinode and back to a minimum, recording at least three standing-wave luminescence images with said microscope each for a different phase of the standing wave field relative to said object, and computing from said recorded images a multilayered tomographical reconstruction of said object.

43. The method of claim 42 wherein each of said at least three standing wave images are recorded at 0°, 90° and 180° respectively, as the phase of the standing wave field relative to said object.

44. The method of claim 42 including changing the node spacing a plurality of times, changing the field phase at least three times at each node spacing, recording an image at each field phase, and computing a tomographic reconstruction of said object.

45. The method of claim 42 wherein said tomographic reconstruction is computed by Fourier synthesis.

46. The method of claim 42 wherein the thickness of the object is greater than the focal depth of said microscope.

47. The method of claim 42 wherein the nodal and antinodal zones of the standing wave field are not constrained to be normal to the optical axis.

* * * * *

UNITED STATES PATENT AND TRADEMARK OFFICE
CERTIFICATE OF CORRECTION

PATENT NO. : 4,621,911

DATED : November 11, 1986

INVENTOR(S) : FREDERICK LANNI, D. LANSING TAYLOR, ALAN S. WAGGONER

It is certified that error appears in the above-identified patent and that said Letters Patent is hereby corrected as shown below:

Column 8, line 32, underline the words "in vacuo".

Column 8, line 47, underneath the equation, insert and center --(for $n_L = 1.36$)--.

Column 10, line 25, after computer, insert --140--.

Signed and Sealed this

Twenty-first Day of April, 1987

Attest:

DONALD J. QUIGG

Attesting Officer

Commissioner of Patents and Trademarks